Sept. 6, 1966  J. MARTIN  3,270,991
EJECTION SEATS
Filed Aug. 5, 1965 2 Sheets-Sheet 1
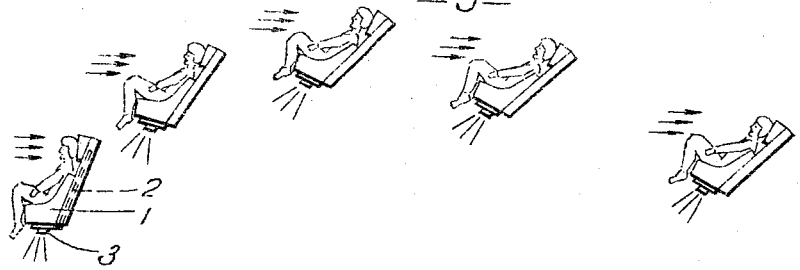
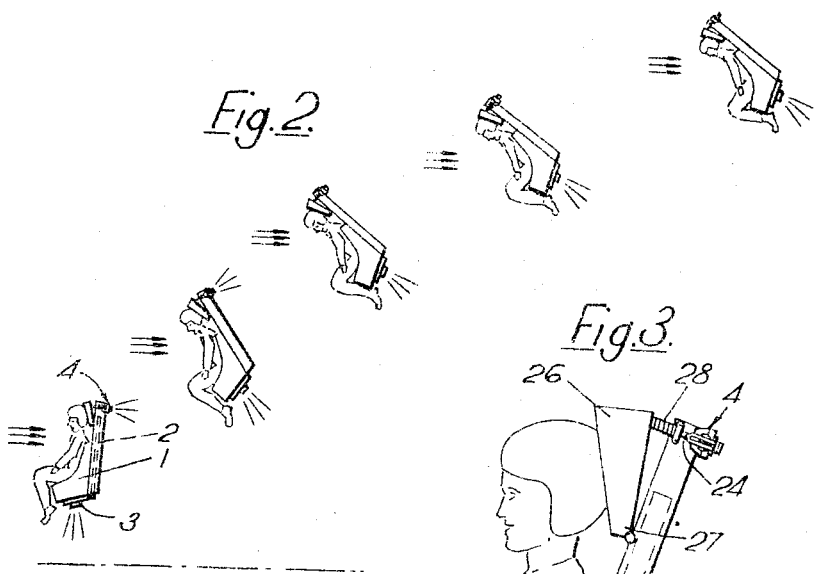
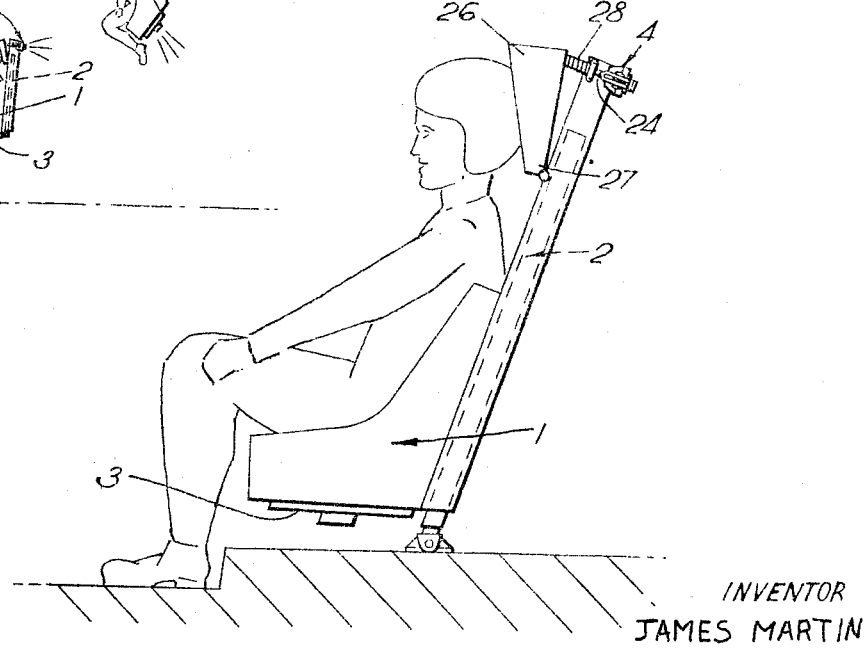
INVENTOR
JAMES MARTIN
BY Kurt Kelman
AGENT Sept. 6, 1966     J. MARTIN     3,270,991
EJECTION SEATS Filed Aug. 5, 1965     2 Sheets-Sheet 2

INVENTOR
JAMES MARTIN
BY Kurt Kelman
AGENT

United States Patent Office 3,270,991
Patented Sept. 6, 1966

3,270,991
EJECTION SEATS
James Martin, Southlands Road, Denham, near Uxbridge, Middlesex, England
Filed Aug. 5, 1965, Ser. No. 477,417
Claims priority, application Great Britain, Aug. 5, 1964, 31,742/64
4 Claims. (Cl. 244—122)

This invention concerns ejection seats for ejecting an airman from an aircraft.

Aircraft ejection seats usually comprise a seat pan mounted on a beam or frame (both hereinafter called, for convenience, a "seat frame") adapted to be projected with the seat pan bodily from the aircraft, ejection means being provided to propel the ejection seat from the aircraft in a predetermined direction relatively thereto as and when required, as, for example, in an emergency either in the air or at ground level.

In aircraft ejection seats successively adopted in practice in the past, ejection of the seat from the aircraft has been effected by means of an ejection gun comprising two or more telescopically co-operating parts adapted to be thrust axially apart by propulsion gases generated by the firing of at least one combustible cartridge, such gun operating between the seat frame and a fixed part of the aircraft and being located in such a position as to exert the thrust in the direction that it is desired that the ejection seat should travel as it moved from the aircraft. The well-known Martin-Baker aircraft ejection seats are of this character and are described, in, amongst others, the Martin patent specifications Nos. 2,467,763, 2,527,020, 2,569,638, and 2,708,083.

When an ejection seat/airman combination is ejected from an aircraft in an emergency it is extremely desirable that the seat/airman combination should obtain a high velocity in the predetermined direction in as short a time as possible consistent with the application of physiologically acceptable acceleration values to the airman; that is to say, it is important that the trajectory of the seat/airman combination relative to the aircraft flight path at the time of ejection should be such that the combination will adequately clear parts of the aircraft, such as the empennage, in any flight condition and especially at high aircraft speeds and/or when ejection occurs during a dive. It is also vital that the seat/airman combination should have a trajectory of adequate height and duration to afford sufficient time for the deployment and effective operation of the airman's parachute or parachutes by which his subsequent descent is controlled when ejection takes place at low aircraft speeds and altitude (for instance, at zero aircraft speed and zero altitude).

The ejection gun of the ejection seat of the above described character can only produce an effective accelerating thrust during the time that the telescopically co-operating parts of the gun are inter-engaged. This means that the ejection gun must produce a very high short-term acceleration in order to achieve a high seat/airman combination velocity and, accordingly, the maximum attainable velocity is limited by the maximum acceleration value that can safely be applied to the airman by the operation of the ejection gun.

In an endeavour to increase the relative height of the trajectory of such ejection seats it is now known to provide such seats with one or more rocket motors having a thrust line which extends substantially parallel to the direction of ejection, such thrust line also passing substantially through the centre of gravity of the seat/airman combination.

It has now been found that an ejection seat/airman combination after ejection from an aircraft is capable of acting as an aerofoil in that positive and negative lift can be produced depending upon the attitude of the seat/airman combination.

It has also been found that during the ejection of an ejection seat equipped only with an ejection gun on the back of the seat and with a seat equipped with such a gun and a rocket motor having a thrust line passing substantially through the centre of gravity of the seat/airman combination, that when the combination is ejected from an aircraft travelling at a relatively low speed a forward pitching of the combination is produced due to the thrust of the gun being off set with respect to the centre of gravity of the combination and the force applied to the seat/airman combination when it emerges from the cockpit of an aircraft does not wholly counteract this forward pitching.

In a case where ejection takes place from an aircraft travelling at a relatively high speed, however, the force applied to the seat/airman combination when it emerges from the cockpit of the aircraft overcomes the forward pitching of the seat and the seat tends to tilt rearwardly.

Tests have shown that at an unfavourable angle of incidence of the seat, such as a rearward tilting of the seat, causes the seat to follow a lower trajectory than is preferred.

It is therefore one object of this invention to provide an ejection seat in which the present-day requirements are more nearly met than hitherto. A further object of the invention is to provide an aircraft ejection seat in which the trajectory of the seat/airman combination on ejection is suitable for safe ejection from the aircraft over a wide range of aircraft flight conditions, including the zero-speed, zero-altitude case.

One particular object of this invention is to provide an auxiliary rocket motor positioned on the seat which will tend to cause the seat to tilt forwardly when required in order that the angle of incidence of altitude of the seat will be more favourable and the seat will follow a higher and more satisfactory trajectory.

Thus, according to this invention there is provided an ejection seat comprising a seat frame and a seat pan mounted thereon; an ejection gun for effecting at least initial ejection of the seat from an aircraft; at least one auxiliary rocket motor positioned on said seat to produce thrust in a direction such as to cause variation of the flight path of the seat; actuating means for initially firing said auxiliary rocket motor and such means being sensitive to aerodynamic forces in excess of a predetermined value.

Very conveniently, said actuating means may comprise a movable head rest on the seat, such head rest being interlinked with said auxiliary rocket motor so that movement of said head rest as a result of aerodynamic forces acting thereon causes initial firing of the auxiliary rocket motor. Preferably said head rest may be biased by, for example, a helical compression spring towards an inoperative position.

According to one feature of this invention said head rest may be interlinked with said auxiliary motor with a yoke member operatively connected to a sear of mechanism for initiating firing of the auxiliary rocket motor.

In order that the invention may be more readily understood one embodiment of ejection seat in accordance with the invention will now be described by way of example and with reference to the accompanying drawings in which:

FIGURE 1 is a diagrammatic drawing indicating the kind of trajectory followed by a seat/airman combination when ejection takes place under conditions which cause the combination to move into a rearwardly tilted and unfavourable attitude.

FIGURE 2 is a diagrammatic drawing indicating the kind of trajectory followed by a seat/airman combinaion when ejection takes place under the same conditions to which the seat/airman combination of FIGURE 1 is subjected but where an auxiliary rocket motor is used to tilt the seat forwardly into a favourable attitude.

FIGURE 3 is a further diagrammatic drawing showing in side elevation an ejection seat in accordance with this invention;

Figure 4:
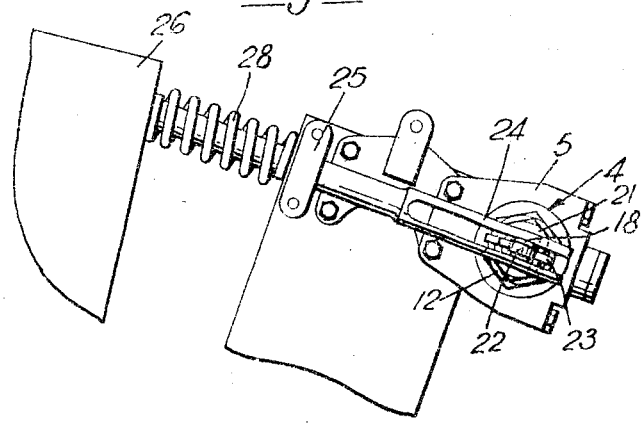
FIGURE 4 is an enlarged fragmentary side elevational view of an auxiliary rocket motor with actuating means therefor.
Figure 5:
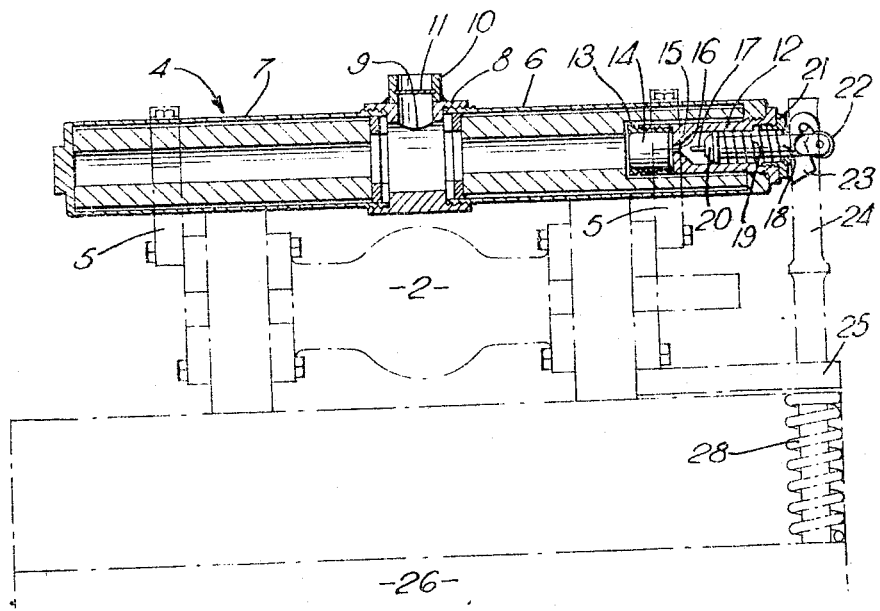
FIGURE 5 is a horizontal medial sectional view of the auxiliary rocket motor, the actuating means and ejection seat structure being indicated diagrammatically in dotted lines.

FIGURE 1 of the accompanying drawings shows diagrammatically the approximate path followed by an ejection seat 1 provided with an ejection gun 2 and rocket motor 3 when said seat is ejected under conditions where the aerodynamic forces acting on the seat/airman combination are sufficiently great to cause such seat to tilt rearwardly into an unfavourable attitude.

FIGURE 2 of the accompanying drawings, on the other hand, shows an ejection seat in accordance with the invention having an auxiliary rocket motor 4, said seat being ejected under the same conditions as the seat of FIGURE 1. This FIGURE 2 indicates the extent by which the height of trajectory of the seat is increased by ensuring that the seat is tilted into a favourable attitude.

In the particular embodiment of seat shown in the accompanying drawings the auxiliary rocket motor 4 is of a generally cylindrical shape and is secured to the ejection seat 1 near the top thereof by a pair of plates 5. The auxiliary rocket motor 4 itself comprises a pair of coaxial cylindrical canisters 6, 7 each open at one end, these said open ends being positioned opposite one another. The open ends of the canisters are externally screw-threaded and these threaded portions are adapted to engage an internally screw-threaded T-piece 8 provided with a rearwardly directed exhaust port 9. The port 9 communicates with a nozzle stub having a hollow plug 10 therein, such plug 10 retaining a frangible diaphragm 11.

The canister 6 incorporates a firing mechanism that comprises a tubular body 12 which fits within the canister and is secured therein by means of co-operating screw-threads on the body and a canister respectively. The inner end of the body 12 is formed by a detachable tubular plug 13 that constitutes a housing for an initiating cartridge 14, the body 12 being divided internally into two chambers by a partition 15 having a central aperture 16 through which a firing pin 17 may pass to enter the initiating cartridge housing to fire the cartridge 14 located in such housing.

The firing pin 17 is mounted on the head of a bifurcated plunger 18 urged towards the partition 15 by means of a compression spring 19 trapped between the head 20 of the plunger 18 and a cap 21 that closes the outer end of the canister. The plunger 18 extends through a central aperture in the cap 21 and the arms of each plunger 18 support a roller 22 for engagement with a sear 23 that extends between the arms and is interposed between the roller 22 and the cap 21.

The arrangement for withdrawing the seat 23 and firing auxiliary rocket motor 4 comprises a yoke member 24 connected at its rear end to said sear 23, the arms of the yoke straddling the sear 23, said yoke member 24 projecting forwardly from said sear 23 through a supporting bracket 25 to the upper end of a head rest 26 pivotally connected at its lower end 27 to the seat 1. A helical compression spring 28 is positioned around said yoke member 24 and is interposed between said supporting bracket 25 and the connection of the yoke member 24 to the head rest 26.

The arrangement is such that normally the head rest 26 is retained in a forward position by the compression spring 28 and only when ejection of the seat/airman combination takes place and the force of the air applied to the head rest when it emerges from the cockpit exceeds the predetermined value does this head rest 26 move rearwardly overcoming the bias of the compression spring 28 and cause the yoke member 24 to move through its supporting bracket 25 and cause withdrawal of the sear 23. Withdrawal of the sear 23 first causes outward movement of the plunger 18 to compress its spring 19 and subsequently releases the plunger 18 so that its spring 19 may impel the plunger inwardly and cause the firing pin 17 to pass through the aperture 16 in the partition 15 to ignite the initiating cartridge 14 in the cartridge housing at the inner end of said tubular body within the canister 6.

I claim:

1. An ejection seat comprising a seat frame and a seat pan mounted thereon; an ejection gun for effecting at least initial ejection of the seat from an aircraft; at least one auxiliary rocket motor positioned on said seat to produce thrust in a direction such as to cause variation of the flight path of the seat; actuating means for initially firing said auxiliary rocket motor and such means being sensitive to aerodynamic forces in excess of a predetermined value.

2. An ejection seat according to claim 1, wherein said actuating means comprise a movable head rest on said seat, such head rest being interlinked with said auxiliary rocket motor so that movement of said head rest as a result of aerodynamic forces acting thereon causes initial firing of said auxiliary rocket motor, said head rest being biased towards an inoperative position.

3. An ejection seat according to claim 2, wherein said head rest is interlocked with said auxiliary rocket motor by a yoke member operatively connected to a sear mechanism for initiating firing of the auxiliary rocket motor.

4. An ejection seat according to claim 3, wherein said auxiliary rocket motor is positioned substantially behind said head rest and has a rearwardly extending exhaust port.

No references cited.

MILTON BUCHLER, *Primary Examiner.*

B. BELKIN, *Assistant Examiner.*